United States Patent [19]

Kirkbride

[11] 4,234,402
[45] Nov. 18, 1980

[54] SULFUR REMOVAL FROM CRUDE PETROLEUM

[76] Inventor: Chalmer G. Kirkbride, 13 Elk Forest, R.D. #2, Elkton, Md. 21921

[21] Appl. No.: 954,302

[22] Filed: Oct. 24, 1978

Related U.S. Application Data

[62] Division of Ser. No. 831,170, Sep. 7, 1977, Pat. No. 4,123,230.

[51] Int. Cl.³ ............................................. C07C 3/24
[52] U.S. Cl. ................................. 204/162 R; 208/209
[58] Field of Search ................... 204/162 R; 208/209

[56] References Cited

U.S. PATENT DOCUMENTS

| 3,503,865 | 3/1970 | Stone | 204/162 R |
| 3,616,375 | 10/1971 | Inoue | 204/162 R |

OTHER PUBLICATIONS

Miyoshi et al., Chem. Abstracts, vol. 83, 100504z, 1975.

Primary Examiner—Leland A. Sebastian
Attorney, Agent, or Firm—Fidelman, Wolffe & Waldron

[57] ABSTRACT

A process for decreasing the sulfur content of coal or crude petroleum is provided, which includes drying coal and subjecting the dried coal in a hydrogen atmosphere to the influence of wave energy in the microwave range.

8 Claims, 1 Drawing Figure

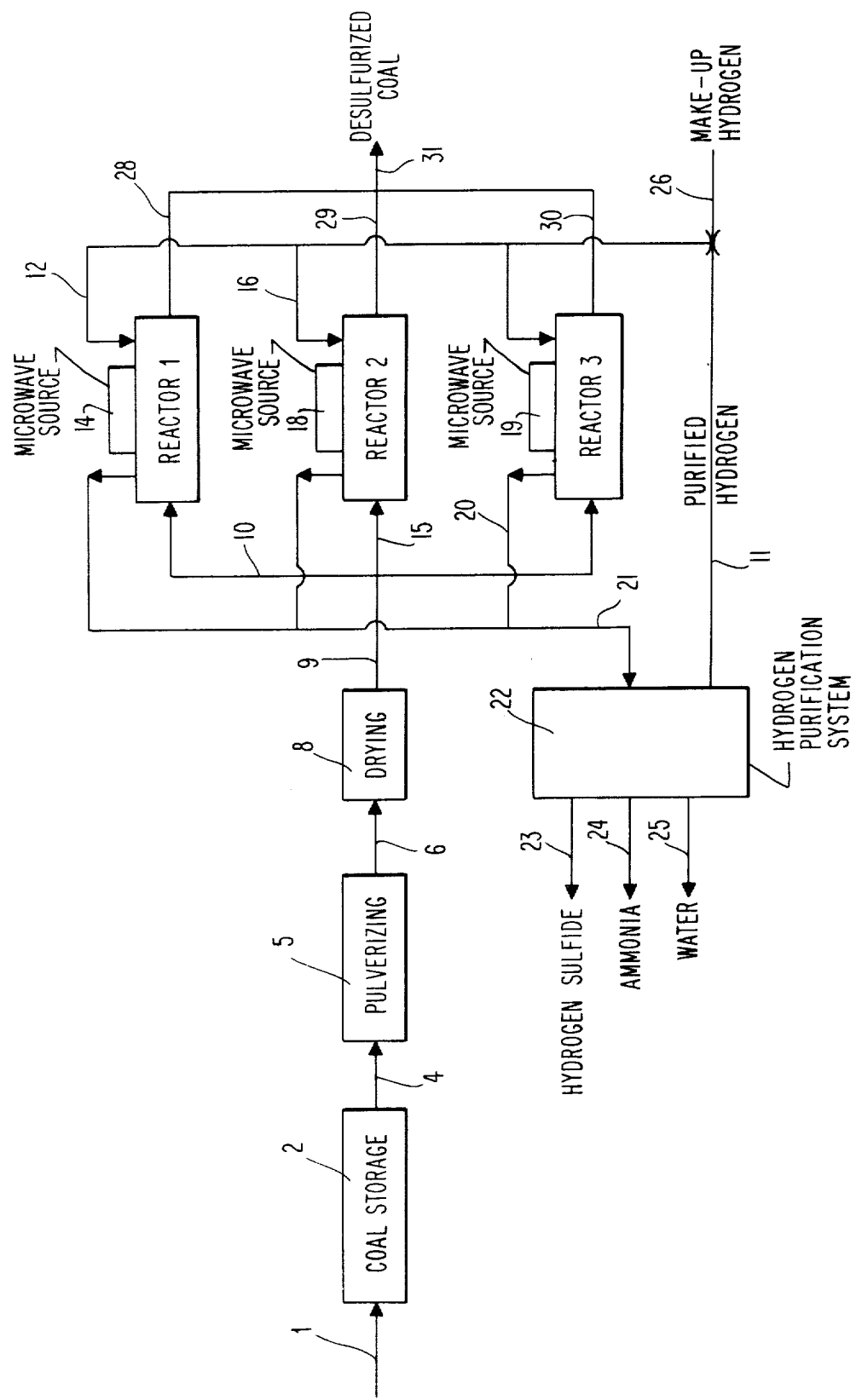

SULFUR REMOVAL FROM CRUDE PETROLEUM

This application is a division of application Ser. No. 831,170 filed Sept. 7, 1977; now U.S. Pat. No. 4,123,230.

BACKGROUND OF THE INVENTION

This invention relates to a process for decreasing or eliminating the sulfur content of coal or crude petroleum. The presence of sulfur in coal causes many industrial problems. For example, the burning of coal for any purpose, such as the production of electricity, is generally legally limited to coal containing a relatively small amount of sulfur so that the emission of sulfur gases is maintained below specified limits. This is necessary because the production of noxious gases such as $SO_2$ has an adverse effect on the environment. Many coals contain substantially more sulfur than is permissible for burning. Heretofore, attempts to lower the sulfur content such as by reaction with hydrogen, usually in the presence of a solvent and a hydrogenation catalyst, have not found commercial success, and certain of these processes are destructive of a portion of the coal by conversion thereof to undesired gaseous or liquid products. An alternative method to sulfur removal from coal is to remove noxious gases from the stack gases, and although a great amount of time and money has been spent to develop a suitable process and equipment, only limited commercial success has been obtained. Also, the blending of high sulfur coal with low sulfur coal to bring the sulfur content of the blend to usable limits is not satisfactory in requiring large amounts of very low sulfur content coal.

The presence of nitrogen and oxygen in coal is also undesirable. On burning the coal, the nitrogen is converted to nitrogen oxide gases, or to particulate matter which, while not considered as objectionable as the sulfur oxides, are undesirable and their release to the atmosphere regulated. The removal of oxygen from coal upgrades the coal by increasing its heating value, i.e., by increasing the British Thermal Units (BTU) obtained per pound of coal on burning.

An object of the invention is to provide a novel process for decreasing the sulfur content of coal in a facile and economical manner.

A specific object of this invention is to provide a novel process for the substantial removal of sulfur from coal without concomitant conversion of appreciable amounts of coal to other products.

A further object is to provide a novel process for contacting dried coal particles with hydrogen under conditions whereby the hydrogen reacts with the sulfur contained in the coal to produce hydrogen sulfide, thereby reducing the sulfur content of the coal.

A still further object is to provide a novel process for simultaneously decreasing the sulfur, nitrogen and oxygen content of coal.

In an embodiment of the invention, coal particles are dried, mixed with hydrogen at an elevated pressure, and the mixture exposed to wave energy in the microwave range. Under the influence of the microwaves, the hydrogen and sulfur react to form hydrogen sulfide which is removed in the gaseous phase so that the coal particles have a significantly reduced sulfur content. Also, under the influence of the microwaves, the nitrogen and hydrogen may react to form ammonia and the oxygen and hydrogen react to form water, so that the coal particles have a significantly reduced oxygen content and may have a reduced nitrogen content.

DETAILED DESCRIPTION OF THE INVENTION

The coal which can be used in the present process is preferably bituminous coal, but all types of coal can be used, such as lignite and sub-bituminous coal. In general, any naturally occurring carbonaceous material including crude petroleum and products therefrom, oil shales and tar sands, give good results in the present process, although equivalent results are not necessarily obtained. For convenience, the invention will be described using "coal," it being understood this term is intended to include the foregoing materials. Coal for use in the process of the invention may vary very substantially in composition. On a dry basis, in weight percent, sulfur will usually be from 0.7 to 9%, oxygen from 4 to 40%, and nitrogen from 1 to 4%. It is desired to reduce the sulfur content to at least 0.7 weight percent and preferably to 0.1 weight percent, and where desired the sulfur content may be reduced to as low as 0.01 weight percent (all on a dry basis). Although removing sulfur from coal is the primary objective of the invention, when reducing the sulfur content to the defined levels, the oxygen content will also be reduced and the nitrogen content may be reduced to be well within acceptable levels and to meet foreseeable environmental standards. Reference is made to my co-pending patent application, Ser. No. 831,171, filed Sept. 7, 1977, now U.S. Pat. No. 4,153,533, which is specifically directed to using oil shale in a similar process.

For use in the process of the invention, the coal is preferably in particle form of a size suitable for the type of operation to be used, which usually will be a fixed, moving or fluidized bed operation. For fixed bed operation, a size that will pass through a two inch screen mesh gives good results. The size of the coal particles is not important except that it affects in some measure the operating conditions and therefore the overall economics of the process, as hereinafter described. Apparatus to use for crushing, grinding or otherwise pulverizing a coarse coal feed for use in the present process may be of type known to those skilled in the art, such as ball mills, rod mills, roller crushers, and the like. The coal particles may advantageously have an average particle diameter of about 1 inch and from about 0.2 to 2.0 inches gives good results in fixed bed operations. Where it is desired to operate under moderate pressures, as hereinafter described, even smaller particle sizes are advantageously used to obtain rapid and intimate mixing of coal and hydrogen, say particles having an average diameter so that 90% will pass a 100 mesh screen. For moving bed operations, particles having an average diameter of ⅛ inch typically will be used, and for fluidized operations the particles typically will be of powder size and may have average diameters as low as 10 microns.

In accordance with the present invention, it is essential that the coal be dried prior to the application of microwaves. By "dry coal," and terms of similar import, is meant coal from which substantially all of the free moisture has been removed. While it is not desired to be bound by theoretical considerations, in the present process wherein a mixture of dry coal and hydrogen is subjected to the influence of microwaves, it is believed that the wave energy causes a localized temperature rise at the situs of each sulfur atom and activates the sulfur atoms so that they react with the adjacent hydrogen to form hydrogen sulfide which is removed as a gas. If water molecules (free moisture) are present throughout the coal mass, they are activated by the wave energy causing a significant increase in the temperature of the entire coal mass which is an inefficiency in energy use and further which may result in the conversion of coal molecules to undesired liquid or gaseous products. While the form in which the sulfur may exist in coal is believed to vary substantially and is not known with certainty, it may be of mineral origin or may form a part of an organic molecule, such as forming a part of a heterocyclic molecule. What is known is that the sulfur content of coal is eliminated or at least markedly reduced in accordance with the present invention.

The coal may be dried by any convenient means. Preferably the coal particles to be used are heated to about 250° F. to drive off free moisture. Depending on the particle size and agitation of the particles, this may require from about 15 to 60 minutes. This time and temperature can be substantially and advantageously reduced by applying a vacuum while heating. Other drying techniques which are known to those skilled in the art, such as by passing a dried inert gas through the heated bed of coal particles, gives good results. Suitable gases include inert gases that will not react chemically with the coal at drying conditions, including hydrogen and nitrogen. Coal may initially contain from 1 to 50% by weight or more of moisture, with bituminous coal generally containing from 1 to 20% moisture. To secure the advantages of the present process, the moisture content should be reduced to not more than 0.5%, and preferably to below 0.2% by weight.

The dry coal is admixed with hydrogen usually at an elevated pressure and subjected to the influence of wave energy in the microwave range. The pressure will usually vary from about 5 psi (pounds per square inch) to 1,000 psi, depending largely on the size of the coal particles, it being remembered that an intimate mixing of coal and hydrogen is necessary, i.e., on subjecting the coal to microwaves, hydrogen must be in the immediate vicinity of the activated sulfur, nitrogen or oxygen atom for reaction to occur. Thus, with small coal particles, say those having an average diameter such that 90% pass a 100 mesh screen, a hydrogen pressure of from atmospheric to 100 psi gives good results, whereas with larger coal particles, say those having an average diameter of 2 inches, a hydrogen pressure of from 400 psi to 500 psi and even more, say up to 10,000 psi, aids the hydrogen in diffusing into the coal particles and gives good results.

The time of exposure of the coal-hydrogen admixture to microwaves is dependent upon the intimacy of association between the hydrogen and sulfur atoms. Thus, with relatively small coal particles and relatively high hydrogen pressure, a short exposure time is sufficient to activate the sulfur atoms and cause reaction with the adjacent hydrogen to form hydrogen sulfide. A time of from 5 to 60 seconds generally will be used with good results, but shorter times where good sulfur atom-hydrogen intimacy is obtained down to about 0.1 second may be used. With larger coal particles and/or lower hydrogen pressure, as much as 10 minutes may give optimum results, but longer times should be avoided because of inefficient energy usage and the formation of undesirable products from the coal.

The temperature to employ during exposure of the dry coal and hydrogen admixture to wave energy is not critical to the process. It is believed that the activation of the molecules and possibly very localized temperature rises, namely in the immediate vicinity, or situs, of the sulfur, nitrogen or oxygen atoms, as herein described, makes unimportant the overall temperature of the coal particle bed. Accordingly, ambient temperature is advantageously used. Where coal drying is at an elevated temperature and exposure of the dried coal-hydrogen to wave energy follows soon thereafter, the elevated temperature may assist the desulfurization reaction to an extent, but relatively high temperatures for the coal particles, say above about 400° F., should be avoided as cracking and the conversion of part of the coal to undesired products may be observed. In general, the overall temperature of the coal mass during the desulfurization reaction is ambient and will be between about 40° F. and 300° F.

The wave energy to use in the present process is in the microwave range and may be from 1 megacycle per second to 1000 gigacycles per second ($10^6$ to $10^{12}$ cycles per second, respectively). These frequencies may be expressed using the Hertz (Hz) Unit, and are the same as from 1 megahertz (1 MHz) to 1000 gigahertz (1000 GHz). As used herein, "megacycles" means "megacycles per second" unless otherwise stated. With some coals it may be advantageous to use two or three or even more frequencies simultaneously or consecutively, as this may be the most efficient operation. While again it is not desired to be limited by theoretical considerations, it is believed that a single frequency does not give optimum activation of all types of sulfur atoms. Thus, the sulfur atom of an aliphatic-type molecule may receive maximum activation at one frequency, while the sulfur atom contained in the ring of an aromatic-type molecule may receive maximum activation at a different frequency. For simultaneous operation, two or more wave energy sources are used at the same time. For consecutive operation, the same coal bed is subjected to wave energy of different frequencies at different times, usually one immediately following the other. An alternative means for consecutive operation which is especially useful where moving or fluidized bed operations are used is to space wave energy sources of different frequencies along the path of the coal particles in the reactor. When using different frequencies, the total time of exposure of the coal to the wave energy will be relatively short because of the high efficiency of the operation, so that times of exposure in the lower portions of the defined range give good results. The desirability of using a multiplicity of wave energy sources and the frequencies to use are best determined by experimentation for a given coal. The equipment for generating microwaves is well known to those skilled in the art. Continuous wave megnatrons with accompanying electronic equipment give good results, and the choice and use of such equipment will be apparent to those skilled in the art.

Oxygen occurring as a component of carbonaceous molecules (the naturally occurring coal molecules including carbon and hydrogen atoms), as distinguished from the oxygen of the free moisture which is removed in the drying step of the process, is also removed in the present process by the reaction of the oxygen atom with hydrogen under the influence of wave energy. This is a desirable reaction as the coal is thereby freed of combined oxygen which increases the heating value of the coal, and the reaction does not result in a significant rise in temperature of the entire coal body apparently because of the limited amount of oxygen present and the removal of the water as formed as vapor. Every one percent reduction in the oxygen content of the coal corresponds to about 65 BTU/lb increase in net heating value. Thus, with coal having a heating value of 12,000 BTU/lb, a 5% reduction in oxygen content will increase the heating value to over 12,300 BTU/lb. Oxygen as a component of carbonaceous molecules may be in the ring structure of five or six-membered rings, the other ring members being carbon, or in ether form as where aromatic units are interlinked through the oxygen, or in a hydroxyl group which may be a phenolic hydroxyl, or in carbonyl groups, or otherwise.

Nitrogen occurring as a component of the coal carbonaceous molecules probably exists as an occasional heterocyclic ring and to some extent as amine groups. As above discussed for oxygen, nitrogen is also removed in the present process by the reaction of the nitrogen atoms, activated by the microwaves, with hydrogen to form ammonia which is removed in the gas phase from the coal. When it is desired to reduce the nitrogen content of coal, together with sulfur, operation should be in the upper pressure range to achieve good results. Pressures of above about 2500 psi give good results, with the amounts removed becoming smaller at lower pressures. This ammonia may be recovered by known means, such as fractionation, from the effluent gases and forms a valuable product, e.g., it can be used as the source of low-cost fertilizer.

On completion or substantial completion of sulfur removal from coal according to the invention, the desulfurized coal is recovered and the gas, consisting primarily of hydrogen, hydrogen sulfide, water and ammonia, is treated by known means to purify the hydrogen, which is recycled to the process. For example, an absorption system including ethanolamine gives good results in purifying the hydrogen, and additional absorbants as known to those skilled in the art can be used, as can the techniques of fractionation and distillation. The recovered coal is suitable for use in any process where a low sulfur-content coal is required.

The process of the invention is advantageously operated as a batch process, although continuous and semicontinuous operations give good results. Where continuous operation is desired, moving bed or fluidized bed operation, depending largely upon the size of the coal particles to be desulfurized, give excellent results. In fluidized operation, hydrogen is advantageously used as the fluidizing medium to carry coal particles upwardly in a conduit having a microwave source or sources positioned in the wall thereof. For convenience, the process will be described herein largely as a batch process using coal particles larger than would be used in moving bed or fluidized operations, it being understood that other types of operation are suitable, so long as the essential steps of the process are observed, namely, converting sulfur-containing coal to coal particles, drying the coal particles, and subjecting a mixture of dry coal particles and hydrogen under pressure to the influence of wave energy within the defined microwave range, and separting coal having a reduced suflur content from the reaction zone. In batch operation it is advantageous to use several reactors, a minimum of three, so that synchronized operations of loading with coal and adding hydrogen, exposing to a wave energy source, and recovery of desulfurized coal as the product of the process and of hydrogen containing as impurities hydrogen sulfide, ammonia and water for purification and reuse in the process.

The accompanying FIGURE is a schematic diagram in the form of a flow sheet illustrating the preferred batch operation embodiment of the process of the invention. Coal from a suitable source is introduced through line 1 to coal storage 2. Coal is withdrawn from storage 2 through line 4, pulverized in zone 5 and sorted (not shown) to the desired size. The pulverized and sized coal then passes through line 6 to drying zone 8 where free moisture is substantially removed as by heating in a rotating, inclined drum, but any suitable drying means can be used. Because of the batch operation of this embodiment, three reactors are provided which, at any given point in time, are operating in different portions of the reaction cycle. Thus, reactor 1 has received a charge of dry coal through lines 9 and 10, been pressurized say to 1,000 psi with hydrogen through lines 11, 26, and 12 and the coal-hydrogen mixture is being subjected to microwave energy by means of microwave source 14. In reactor 2, dry coal is being introduced through lines 9 and 15 and hydrogen (not simultaneously with the coal) through lines 11, 26, and 16 preparatory to subjecting the coal-hydrogen mixture to microwaves from microwave source 18. In reactor 3, the subjecting of the coal and hydrogen mixture to microwaves from source 19 has been completed and reactor 3 is being depressurized for recovery of desulfurized coal through lines 30 and 31. Gases pass from reactor 3 through lines 20 and 21 to hydrogen purification system 22, the gases being largely a mixture of hydrogen sulfide, ammonia, water and hydrogen. The removal of these materials is shown schematically as through lines 23, 24 and 25, respectively. Purified hydrogen is recycled to the system through line 11 and make-up hydrogen is introduced as needed through line 26. Desulfurized coal is recovered from the reactors through lines 28, 29, and 30 and common line 31. It will be understood that, as any reactor moves through the cycle of operation, the lines of material supply and withdrawal will operate as described above for the reactor in the particular mode of operation in question. It will be further understood that, although separate microwave sources, one for each reactor, are shown in the FIGURE, a single source with suitable switching and transmission may be preferred. Suitable piping, valves, electrical switches, pressure gauges and the like will be apparent to those skilled in the art and accordingly are not described in the FIGURE.

As above defined, crude petroleum and petroleum products are carbonaceous materials within the definition of "coal" as used herein, and give good results in the present process. Thus, crude petroleum ready for pipeline transmission, i.e., having a low B. S. and W. (bottom sediment and water) content, is admixed with hydrogen and subjected to microwaves. It is important that the free moisture content be low, say below 0.5 wt. %, since the oxygen of the water will heat and react causing an inefficiency in energy usage. Unreacted hydrogen and hydrogen sulfide are recovered from the crude oil, and the hydrogen purified and recycled to the process. This is advantageously accomplished by passing the crude and hydrogen through a tube reactor fitted with a microwave source. Preferably the hydrogen pressure in the tube is maintained above atmospheric, and usually will be from about 5 to 3,000 psi, although pressures up to about 10,000 psi give good results. With increasing pressure, more hydrogen goes into the liquid phase to be adjacent the sulfur atoms which are present usually as a part of a complex molecule including sulfur, carbon and hydrogen, for reaction to occur. As described above for coal, oxygen and nitrogen may also react with hydrogen and be removed in the present process. On completion of the reaction, the pressure is reduced to atmospheric and the gases, consisting of unreacted hydrogen, hydrogen sulfide, and where appropriate, ammonia, removed. Any moisture formed, which may have ammonia dissolved therein, is removed by known means. Elevated temperatures and reduced pressures may be used to assist in the removal of gases.

Products which are fractions of crude petroleum such as diesel fuels, furnace oils, cracking and reformer charge stocks, gasoline, and naphtha illustrate such fractions from which sulfur may be removed in accordance with the present invention.

In the embodiments of the invention where the charge is a petroleum liquid, subjecting the hydrogen-liquid charge mixture to microwaves may be performed in the presence of a known hydrogenation catalyst including the oxides and sulfides of cobalt, molybdenum, or nickel on bauxite or a synthetic silica-alumina composition. Molybdenum sulfide deposited on silica-alumina, for example, gives good results. This may be done by way of fixed bed, moving bed or fluidized bed operation, or by dispensing catalyst particles in the hydrogen-liquid charge mixture. Advantageously reactors usually employed in such reactions can be fitted with a wave energy source, such as a continuous wave megatron, so that the sulfur atoms of the liquid charge contact the catalyst and hydrogen molecules while being subjected to microwaves.

In using a petroleum charge stock, it may have a sulfur content usually of from 0.7 to 1.5 wt. % (as sulfur) although higher contents up to 10 wt. % may be experienced and give good results in the process. The sulfur content of the products will be reduced substantially, the actual amount remaining being dependent on reaction conditions for a given charge. The reaction conditions can be adjusted to lower the sulfur content the desired amount. Generally products having sulfur contents of 0.5 wt. % or less will be obtained, and it may be desired to lower the sulfur content to 0.01 wt. % or even less.

The following Examples illustrate the process of the invention. As used in the Examples, "wt. %" means "percent by weight" on dry basis.

EXAMPLE 1

A Pittsburgh coal having 1.3 wt. % sulfur, 1.6 wt. % nitrogen, 6.2 wt. % oxygen, and about 6 wt. % free moisture, is crushed to an average particle diameter of about ½ inch. The coal is heated to 250° F. for 40 minutes to remove free moisture and then introduced into an autoclave reactor fitted with a microwave generator. Hydrogen is introduced into the reactor to a pressure of about 500 psi. The coal-hydrogen mixture is subjected to microwave energy of 1,000 megacycles for about 1 minute. The coal is removed from the reactor and has a reduced sulfur content of about 0.06 wt. %. Hydrogen consumption is about 3,200 scf (standard cubic feet) per ton of coal used, of which about 380 scf go into producing hydrogen sulfide and 2920 scf into producing water; for complete conversion of the sulfur and oxygen in this Example a total of 3260 scf (standard cubic feet) of hydrogen is required.

EXAMPLE 2

The procedure of Example 1 is repeated except that, in drying the coal, it is heated only to 200° F., and subjected to a vacuum of about ½ atmosphere for 20 minutes. The pressure is brought back to atmospheric by the introduction of hydrogen, and the hydrogen introduction is continued to a pressure of about 200 psi. The exposure to microwave energy is about 30 seconds. The sulfur content of the coal is reduced to below about 0.02 wt. %.

It is believed that the use of a vacuum in drying the coal and the bringing up to pressure with hydrogen results in the excellent distribution of hydrogen into and through the coal particles so that the hydrogen is adjacent at least most of the sulfur atoms and is available for reaction therewith when the wave energy is applied.

In the process of this Example 2, it is advantageous to use a single vessel for drying, introducing hydrogen, and subjecting the coal-hydrogen mixture to wave energy.

EXAMPLE 3

An Illinois coal of 11,480 BTU/lb, water content of 12.1 wt. %, and having a weight percent on a dry basis the following: sulfur=2.3, oxygen=18.6 and nitrogen=1.3, is ground to 100 mesh size and dried at 250° F. for about 30 minutes. The coal is divided into three batches and treated as follows:

(a) The first coal batch is introduced into a reactor filled with a continuous wave magnetron and the entire reactor thoroughly flushed with hydrogen. At one atmosphere of hydrogen pressure the coal is subjected to 25 megacycle microwaves for 30 seconds. The sulfur and oxygen contents are reduced to 0.3 and 14.6 wt. %, respectively, while the nitrogen content remains unchanged. Hydrogen consumption is about 2800 scf per ton of coal.

(b) The procedure of (a) of this Example is repeated with the second batch except that the hydrogen pressure is increased to 250 psi. The sulfur and oxygen contents are reduced to 0.09 wt. % and 11.1 wt. %, respectively, while the nitrogen content remains unchanged. Hydrogen consumption is about 5760 scf per ton of coal.

(c) The procedure of (a) of this Example is repeated with the third batch of coal except that the hydrogen pressure is increased to 3,000 psi. The sulfur and oxygen contents are reduced to 0.023 wt. % and 7.3 wt. %, respectively, and the nitrogen content is reduced to 0.05 wt. %. The consumption of hydrogen is 10,420 scf per ton and ammonia production is 30.3 pounds per ton of coal.

EXAMPLE 4

Lignite from North Dakota of 7,210 BTU/lb and water content of 34.8 wt. % is pulverized to pass a one inch screen and dried at 250° F. for about 1 hour. It is then subjected to microwaves of 2.5 megacycles frequency for 30 seconds at 25 psi hydrogen pressure. The sulfur and oxygen contents are reduced from 0.7 wt % and 43.3 wt. % to 0.08 wt. % and 37.1 wt. % respectively. The nitrogen content is not appreciably changed. Hydrogen consumption is 3,610 scf per ton of coal.

EXAMPLE 5

An Illinois coal of 13,100 BTU/lb and a moisture content of 8 wt. % is pulverized to pass a one inch screen and dried at 250° F. for 1 hour. The moisture content is reduced to 0.2 wt. %. The dried coal is then subjected to 60 megacycle microwaves for 45 seconds at one atmosphere of hydrogen pressure. The sulfur content is reduced from 5.0 to 0.53 wt. % and the oxygen content from 8.7 to 7.8 wt. %. Hydrogen consumption is 1,750 scf per ton. The nitrogen content 2 wt. % remains essentially unchanged.

EXAMPLE 6

Example 5 is repeated except the hydrogen pressure is increased to 2,000 psi. The sulfur, oxygen and nitrogen contents of the coal are reduced to 0.005 wt. %., 4.0 wt. % and 0.08 wt. %, respectively. Hydrogen consumption is 7,140 scf per ton and ammonia production is 39.2 pounds per ton of coal.

EXAMPLE 7

An Ohio coal of 12,200 BTU/lb and moisture content of 10.5 wt. % water is pulverized to 100 mesh and dried at 250° F. for 20 minutes. The moisture content is reduced to about 0.1 wt. %. The dried coal is subjected to 18 megacycle microwaves for 15 seconds at 100 psi hydrogen pressure. The sulfur and oxygen contents are reduced from 4.0 wt. % and 10.3 wt. % to 0.9 and 8.4 wt. %, respectively. The nitrogen content (2.1 wt. %) remains substantially unchanged. Hydrogen consumption is 1,880 scf per ton of coal.

EXAMPLE 8

The procedure of Example 7 is repeated except that microwaves of 10 megacycles are used. The sulfur and oxygen contents are reduced to 0.28 and 7.3 wt. %, respectively, while the nitrogen content remains essentially unchanged. Hydrogen consumption is 2,800 scf per ton of coal.

EXAMPLE 9

The procedure of Example 7 is again repeated except that the time of exposure to the microwaves is increased to 60 seconds. The sulfur and oxygen contents are reduced to 0.04 wt. % and 4.5 wt. %.

EXAMPLE 10

The Illinois coal of Example 5 is ground to pass through a 100 mesh screen. It is dried by heating to 250° F. and agitating with dry hydrogen gas. The dry coal is then subjected to 500 psi hydrogen pressure and simultaneously to microwaves of 13.5 and 60 megacycles for 30 seconds. The sulfur, oxygen and nitrogen contents are reduced to 0.01 wt. %, 2.2 wt. % and 0.75 wt. %, respectively. Hydrogen consumption is 5,160 scf per ton of coal and ammonia production is 25 lbs per ton of coal.

EXAMPLE 11

The Illinois coal of Example 5 is crushed to an average particle diameter of about ⅜ inch (commonly called "pea size") and dried at 250° C. for 60 minutes to reduce the moisture content to below about 0.2 wt. %. The dried coal at a hydrogen pressure of 250 psi. is subjected simultaneously to the output of three microwave sources having frequencies of 18, 2.5 and 500 megacycles for 30 seconds. The sulfur, oxygen and nitrogen content of the coal is reduced to 0.01, 1.1 and 1.8 wt. %, respectively. Hydrogen consumed is 6,775 scf per ton of coal and ammonia production is 42.5 lbs. per ton of coal.

EXAMPLE 12

Example 11 is repeated except, instead of subjecting the coal to the simultaneous action of three microwave frequencies for 30 seconds, the coal is subjected to the three different microwave frequencies individually in immediate sequence (first 18, then 2.5, and finally 500 megacycles) for 10 seconds each. Substantially the same results were obtained as described for Example 11.

EXAMPLE 13

A petroleum fraction (naphtha) having a boiling range of from about 400° F. to 500° F. and a sulfur content of about 1 wt. % is introduced into an autoclave reactor fitted with a microwave generator. Hydrogen is introduced into the autoclave to a pressure of 1,000 psi. At ambient temperature the hydrogen-naphtha mixture is subjected to microwave energy of 1,000 megacycles for 40 seconds. The reactor is depressurized and dissolved gases driven from the naphtha by heating with agitation. The sulfur content of the naphtha product is 0.1 wt. %.

EXAMPLE 14

A topped mid-continent crude petroleum having a sulfur content of about 7 wt. % is introduced into the autoclave reactor of Example 13. Hydrogen is introduced to a pressure of 1,000 psi and the crude-hydrogen, at ambient temperature, subjected to microwave energy of 1,000 megacycles for 60 seconds. After depressurizing and removing dissolved gases, the crude petroleum product has a sulfur content of below 0.5 wt. %. Hydrogen consumption is about 450 scf. per barrell of crude petroleum.

PREFERRED EMBODIMENT

As described above, the preferred embodiment of the present invention includes a process for reducing the sulfur content of coal without significantly converting coal hydrocarbonaceous molecules to liquid or gaseous products which comprises drying coal particles to a free moisture content of below about 0.5 percent by weight and subjecting the dry coal particles to microwave energy while in contact with hydrogen under a pressure of from atmospheric to 10,000 psi.

I claim:

1. Process for reducing the sulfur content of crude petroleum which comprises subjecting a mixture of said crude petroleum having a free moisture content below 0.5 weight percent and hydrogen to microwave energy.

2. Process for reducing the sulfur content of crude petroleum which comprises drying said crude petroleum and subjecting a mixture of the dried crude petroleum and hydrogen to microwave energy.

3. Process according to claim 2 wherein said dried crude petroleum has a free moisture content below 0.5 weight percent.

4. Process for reducing the sulfur content of crude petroleum which comprises drying said crude petroleum and subjecting a mixture of the dried crude petroleum and hydrogen to microwave energy at a temperature of from about 40° F. to about 300° F. for a time of not more than ten minutes, and recovering a petroleum liquid having a reduced sulfur content as a product of the process.

5. Process according to claim 4 wherein said crude petroleum is contacted with microwave energy in the presence of a hydrogenation catalyst.

6. Process according to claim 4 wherein the microwave energy is comprised of at least two frequencies.

7. Process according to claim 4 wherein the microwave energy is comprised of at least two frequencies applied simultaneously.

8. Process according to claim 4 wherein the microwave energy is comprised of at least two frequencies applied consecutively.

* * * * *